(12) United States Patent
Simelius et al.

(10) Patent No.: US 7,313,276 B2
(45) Date of Patent: Dec. 25, 2007

(54) METHOD AND DEVICE FOR OPERATING AN ELECTRONIC COMMUNICATION NETWORK GAME

(75) Inventors: Kim Simelius, Tampere (FI); Tuomas Matila, Oulu (FI)

(73) Assignee: Nokia Corporation, Espoo (FI)

( * ) Notice: Subject to any disclaimer, the term of this patent is extended or adjusted under 35 U.S.C. 154(b) by 758 days.

(21) Appl. No.: 10/834,394

(22) Filed: Apr. 28, 2004

(65) Prior Publication Data

US 2004/0268381 A1 Dec. 30, 2004

(30) Foreign Application Priority Data

Apr. 28, 2003 (WO) .................... PCT/IB03/01618

(51) Int. Cl.
*G06K 9/00* (2006.01)
(52) U.S. Cl. ..................................... 382/181
(58) Field of Classification Search ............... 382/181, 382/190, 203, 206, 218, 289, 291, 299, 305; 715/500; 340/5.53, 5.61; 434/353; 455/899; 463/29, 40, 43
See application file for complete search history.

(56) References Cited

U.S. PATENT DOCUMENTS

| | | | |
|---|---|---|---|
| 4,508,353 A | 4/1985 | Meyer et al. | |
| 6,346,043 B1 | 2/2002 | Colin et al. | |
| 6,633,223 B1 * | 10/2003 | Schenker et al. | 340/5.53 |
| 7,062,107 B1 * | 6/2006 | Crosby et al. | 382/299 |
| 7,130,467 B1 * | 10/2006 | Bronder et al. | 382/218 |
| 7,162,084 B2 * | 1/2007 | Herley | 382/173 |
| 7,233,708 B2 * | 6/2007 | Li et al. | 382/305 |

FOREIGN PATENT DOCUMENTS

| | | |
|---|---|---|
| JP | 08016807 | 1/1996 |
| JP | 1998-473884 | 7/2002 |
| KR | 2002-035513 | 5/2002 |
| WO | WO 01/49056 | 7/2001 |

* cited by examiner

*Primary Examiner*—Jose L. Couso
(74) *Attorney, Agent, or Firm*—Alfred A. Fressola; Ware, Fressola, Van Der Sluys & Adolphson LLP

(57) ABSTRACT

The present invention relates to a method, device and computer program product for exchanging and processing image data within the context of playing a wireless network based game. A first object is a reference object which is provided by a first party. At least one second object is a comparison object which is provided by at least one second party and the first party and the at least one second party are involved in a comparison procedure over a communication network. Information is established which is indicative of the first object and a task is generated which relates to the first object which is available to the at least one second party. The first party receives the at least one second object from the second party. The second object is compared to the first object, with a value generated based upon the comparison.

19 Claims, 7 Drawing Sheets

METHOD AND DEVICE FOR OPERATING AN ELECTRONIC COMMUNICATION NETWORK GAME

CROSS REFERENCE TO RELATED APPLICATIONS

This application claims priority under 35 USC §119 to International Patent Application No. PCT/IB03/01618 filed on Apr. 28, 2003.

TECHNICAL FIELD

The present invention relates to a method, a device and a computer program product for exchanging and processing image data within the context of playing a wireless network based game. It also relates to mobile telephones and multi media message technology in a public switched mobile telephone network. This invention also relates to the technical implementation of marketing methods like "seek and find," spotting etc. competitions.

BACKGROUND OF THE INVENTION

In recent years mobile telephones took over many "every day" tasks such as planners, reminders, telephone lists, directories of addresses. Another aspect in the functionality of mobile network devices is to provide entertainment features. Today, games such as space attack, snake, pairs, pinball, have been adapted to the limited resources of mobile telephones.

There are already several types of games and entertainment applications that use mobile communication devices as a basis. For example in Finland you can chat through television by sending SMS to certain numbers and your message is shown on the screen for everybody to see. Such features are also provided on interactive shows on "Music Television" programs.

Imaging phones together with multimedia messaging technology and e-mail capabilities have simplified the capture and sending of images. However, the traditional short messages can often carry all the necessary information so the additional transfer of an image to an addressee is often not regarded as being worth the cost.

There have been both useful and fun applications to use captured images. For example, the pictures taken by a user with an imaging phone can be stored onto a network server and shared from there among friends. Also, the pictures can be used in the terminal as a basis for games, e.g., in the MixPix application in the Nokia 7650 imaging phone.

The invention relates to a use of image comparison. With an increasing spread of mobile terminals the market for mobile terminal phones becomes more and more saturated. To be able to sell a new mobile phone it is required to provide more and better features in a mobile phone providing an increased usability beyond the provision of solely a voice connection.

Image based electronic games are e.g. described in the U.S. Pat. No. 6,346,043 and U.S. Pat. No. 4,508,353 and in the Japanese Patent Application number JA 08016807 A.

An image based electronic game is disclosed in the U.S. Pat. No. 6,346,043 that is implemented as an image matching game for use in slot machines, where images and arrangements of images shown to user are prize-related.

U.S. Pat. No. 4,508,353 discloses an image matching video game based on memory games where users have to choose between two matching images during a certain time period. The arrangement can simply be described as a kind of electronically animated pairs game, with fewer moving pairs.

JP 08016807 describes an object picture comparison device where pictures can have a certain fighting strength based on predetermined qualifiers on picture data and this strength can be used to compare the strengths of two different pictures to determine a winner.

Now, there are spotting competitions based e.g. on calls. A radio station may broadcast, "Find our commercial car and call us. The first spotter will get a prize."

A motivator for sending multimedia messages is needed both to boost the operator revenue from the technology and to reveal the potential of picture messaging to holders of imaging phones. Also, new ways of using the captured images are needed. The exchange of images is a new dimension in mobile communication and applications adapted to be attractive for creating fun and distraction out of pictures are still few.

It is further desirable to enhance the known spotting type of competitions organized by local radio stations, restaurants and the like that are based on calls.

It is further desirable to have a game that fully uses the resources provided by modern camera phones. Pictures have been used in different kind of memory games through certain times and with camera phones it is desirable to make this use larger and more varied.

SUMMARY OF THE INVENTION

According to a first aspect of the present invention, there is provided a method for comparing at least two objects. In said method a first object is a reference object provided by a first party and at least one second object is a comparison object provided by at least one second party, and the first party and the at least one second party are involved in the comparison over a communication network. This method comprises: making information indicative of said first object and a task related to said first object available to said at least one second party, receiving at said first party at least one second object from said second party, wherein said at least one received second object has been formed according to said task by said at least one second party, and comparing said at least one first object with said second object to determine a value (degree) of similarity.

In order to provide a clear example the invention will be described in the following by an example for operating an electronic communication network game. In all the following descriptive examples of the network game implementation, the first party is the organizer of the game, the second party is/are the participants or players. The information indicative of said first object and a task related to said first object, are referred to in the description as task pattern and task. Said second object is referred to as pattern, and the first object is referred to as reference pattern.

In the game implementation said method comprises posting a task pattern and a task, receiving at least one pattern from players via said wireless network, comparing said received pattern with a reference pattern to determine a value or degree of similarity and notifying the winning players who sent patterns exceeding a determined or predetermined value or degree of similarity.

By posting task pattern and a task related to said task pattern, the task and said task pattern is made available to potential players. The task may contain the rules of the game. The task can be to take a picture. The task can also be any other arbitrary task, the completion of which can be proved by a picture or a respective pattern. The kind of task pattern used is not fixed and can depend on the type of the task. The task can e.g. be: "Take a picture of the car or a logo on the car or the license plate of the car (depicted in the task pattern) and send it to number xxx." The posting of the task pattern can be performed via an information or communication network, such as Internet mobile telephone networks, broadcast or television networks. The task and the task pattern may also be posted to potential players as a magazine supplement, as a postcard, an e-mail, an MMS (multi-media message) or a short message (SMS). The task includes an address to send the picture to, which proves the completion of said task.

It may be noted that the task is not necessarily a competition. The invention may be used also in science when handling a large amount of observations. For example, in biology there might be a need to get a fast survey of the amount of a certain butterfly or such. Enquiry for a bird or butterfly under interest could be sent to a number of people located in the study area. The results may be handled automatically to get a statistical result of some accuracy. The science applications are not necessarily price related. In case of science applications such as virtual "Butterfly hunting" an additional transmission of the actual location or coordinates where the picture has been taken may be useful as would be the transmission of the time the picture has been taken.

In one example embodiment of the present invention a decision on the success of the carrying-out of the task is made, wherein said decision of said success is based on said value of similarity.

Another application can reside in people spotting tasks, wherein the task can be to shoot a "star portrait" of a prominent person. In other applications the method can comprise tasks that comprise e.g. descriptions or "wanted" posters for look alike competitions or for hunting down suspect, convicted or fugitive persons or missing or lost pets. It may be important to make clear that the task is a game like application or a part of a police action. It should definitively be avoided to perform look alike contests with fugitive suspected persons. The same principle can also be applied to any kind of lost and found applications.

The number of possible applications can easily be extended to any kind of distributed tasks. The tasks can also be used to collect data in field works. Telephone booth operators can use the task to collect an overview over the conditions of telephone booths, wherein the task can include a "negative rating" wherein the price to be won decreases with the number of pictures received from a single booth. In this case a position information and a time information can be very useful. The collected data can be used to evaluate which telephone booth actually requires maintenance, cleaning and/or service.

It is supposed that at least one user or player sends a picture as an answer to said posted tasks and said posted task pattern. The message is received via a wireless network. The received pattern provides a solution of said task, or a proof of the completion of said task.

The completion of the task is checked by comparing said at least one received pattern with a reference pattern, to determine a value of similarity. The completion of the task should lead to an unambiguous pattern that can be compared with a proposed solution. It should be noted that the task pattern and the reference pattern need not be identical.

In another example embodiment said method further comprises notifying said at least one second party whose second object exceeds a determined value of similarity.

By notifying the players whose received patterns exceed a determined degree of similarity is executed. In the simple case the notification can be performed by a simple short message sent to the sender of the pattern with highest similarity with regard to the reference pattern. In more sophisticated games operated by commercial game operators, prices may be used and prices of different value may be provided according to the degree of similarity reached.

In the case of the above exemplary task example, the method comprises receiving a digital picture of the target (taken with an imaging phone), e.g. via MMS at a given number/address (server), comparing the picture sent and the reference picture at the server and giving a feedback to the sender whether the match is acceptable or not by using, e.g., SMS or MMS. To complete this method, the comparing server must have added intelligence to be able to handle this method.

In another example embodiment said method further comprises receiving at least one first or second object from at least one second party via a wireless network. In case that a first object is received, a player proposes a new task or a new first object. In the other case this includes receiving at said first party at least one second object from said second party, wherein said at least one received second object has been received via said communication network.

In yet another example embodiment of the present invention, said making information indicative of said first object and said task available to said second party, is performed by using said communication network. Thereby, the method can be performed by using only the communication channels provided by the communication network.

In another example embodiment of the present method said at least one pattern or second object received is at least one digital picture. By using pictures the accessibility and the use of picture enabled phones can be improved. By using a digital picture that can be taken within seconds, the user can simply and readily take part in the game without the need to perform complicated actions or to accurately study the use instructions.

In yet another example embodiment said task pattern or said information indicative of said first object is substantially identical to said reference pattern or said first object. The task pattern can be partially identical to the reference pattern. The task pattern can be fully identical to the reference pattern. The task pattern can be depicted as a cartoon-like drawing to prevent a user from simply re-using the task pattern or picture as his pretended own solution.

In another example embodiment of the method, said comparing of said second object with said first object or of said at least one received pattern with said reference pattern is performed by pixel matching, region matching, shape counting or a combination of these. The kind of algorithm used to determine the similarity may be prescribed by the organizer of the game, or may be left to the respective user. Different algorithms can be used to compensate for different focal lengths of different cameras, variations in the resolution of the cameras and other disturbing effects. In this exemplary embodiment, the pictures need not resemble each other visually, but instead, e.g., the number of round objects in the picture is the only criterion that counts. Any combination of such shape matching and pattern matching can also be used: the matching criterion may comprise taking a picture containing a certain task pattern and certain shapes.

In yet another example embodiment said task pattern or said information indicative of said first object or said reference pattern comprises a region of interest. Said region of interest can be emphasized by a mark or a label. In the above exemplary car picture task example the car represents the region of interest and is not background. In the task pattern or picture the region of interest can be emphasized by a label. In case that it can be expected that e.g. the outline of a target is relatively unique, the task pattern can only comprise the outline, wherein the task is to find the right object fitting closely in said label.

According to another aspect of the present invention a method for comparing at least two objects is provided, wherein a first object is a reference object provided by a first party and at least one second object is a comparison object provided by at least one second party, and the first party and the at least one second party are involved in the comparison over a communication network. The method comprises: establishing one of a plurality of parties as a first party, and all other parties as second parties. The method is followed by the steps performed at said first party of generating said first object, making information indicative of said first object and a task related to said first object available to said at least one second party, via said communication network, followed by receiving at said first party at least one second object from said second party, wherein said at least one received second object has been formed according to said task by said at least one second party. Then said at least one second object is compared with said first object to determine a value of similarity, to make a decision on the success of the carrying-out of the task, wherein said decision of said success being based on said value of similarity. Following that, the first party notifies said at least one second party whose second object exceeds a determined value of similarity, and passes the state of the first party to one of said second parties by establishing one of said second parties as first party.

In the network game implementation aspect of the invention this means that said method further comprises generating a task pattern and passing the game to the next player. By generating a task pattern a new round or cycle of said game can be started e.g. by taking a picture. A single game round can be terminated by passing the next round to another player game server component, when the winner of the last round has been determined. Till this section only the actions of a game server or a challenger have been described.

By receiving a task pattern and a task related to said task pattern a potential player gets the opportunity to participate in the game. The task includes a task to take a picture of an object according to said task pattern and an address to send said picture to. By sending the picture to a game server via a wireless communication network, the user can directly use the picture taking and sending option on his mobile phone and therefore there is no need for complicated or time consuming user input.

In case that the task picture is the reference picture, the user can evaluate the degree/grade of similarity by comparing his picture and the reference picture on his mobile device. The advantage of such a procedure is that a user may only participate in the game when he can expect a realistic chance to win. This feature would have the effect that the number of sent images is reduced and the quality or similarity of the sent messages is increased. So according to the present example, the game may be played in different leagues i.e. with different equipment. If the similarity of a picture can be determined before the picture is transmitted to the challenger device or the server, care should be taken that both similarity determinations on both devices lead to similar or identical results.

According to another aspect of the present invention a method is provided for taking picture according to a target or reference pattern or picture. The method comprises displaying the range of view of said camera and said reference pattern in the viewfinder of said camera by using cross-fading techniques. For example the reference pattern comprises a region of interest marked by a silhouette of a region of interest depicted in a crosshair style in the viewfinder of said camera. In case of a target silhouette the target can simply be overlaid or superimposed onto the display of the viewfinder. In case of a more complex target picture it can be carried out so that both the received image and the viewing area of the camera are overlapped (50% transparency of the viewing area) as it is in case known from double exposures. Another way to overlay the viewing range and the reference picture is to depict both in a split screen manner. Another possibility is to use an alternating display depicting the viewing range and the reference picture in alternation. The number of alternations per second or per minute may be selectable or predetermined.

According to another aspect of the present invention, a method for operating a network game system comprises server and network devices in a wireless communication network using procedures described in the preceding description.

In another example embodiment said first and/or second objects or patterns are transferred by using multimedia messaging. By transferring the taken pictures by multimedia messaging, the pictures can easily be received and processed by an automated electronic device such as a mobile communication device or a game server. By transferring the task patterns by multimedia messaging, the tasks and the task patterns or pictures can easily and automatically be sent only to potential players. Electronically transferred tasks and task pattern or reference patterns have the advantage that the human resources to operate such a game can be minimized. The notification of the winners can also be performed by using the communication network.

In another example embodiment said notifications of the second parties or players are posted using a television broadcast network. Other possibilities to notify the players is to use radio broadcast, teletext, Internet, wireless application protocol, short messages or multimedia messages, or by letter, postcard, or packet.

The task could be to take a picture of a certain event in a TV show. The commercial scene in the TV can e.g. include a task such as "Take a picture of the person starring in our newest TV-commercial". The picture may be to be taken on a live event or directly at a certain moment during the commercial. To achieve this it could be helpful to have a digital camera that can be synchronized with the picture of a TV screen. For an advertising campaign it could also comprise tasks such as "Take a picture of the person starring at our newest TV-commercial".

According to yet another aspect of the invention, a software tool is provided comprising program code means for carrying out the method of the preceding description when said software tool is run on a computer or a network device.

According to another aspect of the present invention, a computer program product downloadable from a server for carrying out the method of the preceding description is provided, which comprises program code means for performing the steps of the client or the server of the preceding methods when said program is run on a computer or a network device.

According to yet another aspect of the invention, a computer program product is provided comprising program code means stored on a computer readable medium for carrying out the method steps of the preceding description, when said program product is run on a computer or a network device.

According to another aspect of the present invention a computer data signal is provided. The computer data signal is embodied in a carrier wave and represents a program that makes the computer perform steps of the method contained in the preceding description, when said computer program is run on a computer, or a network device.

According to yet another aspect of the present invention a network device or a network server for comparing at least two objects is provided, wherein a first object is a reference object provided by a first party and at least one second object is a comparison object provided by at least one second party, and the first party and the at least one second party are involved in the comparison over a communication network. The network device comprises a storage, a network interface and a central processing unit. The storage is for storing said first object and a task related to said first object. Said network interface is connected to said communication network to receive at least one of said second objects from said at least one second party via said wireless network. Said central processing unit is connected to said storage and to said network interface.

Said central processing unit is configured to compare said at least one received second object with said first object pattern to determine a value of similarity for each of said received at least one second objects in relation to said first object according to said stored task, and wherein said central processing unit is further configured to notify senders of said received second objects via said network interface of and according to said determined value of similarity and said stored task.

In case of the network game application this implementation feature can be regarded as a network server for operating an electronic communication network game. The network device comprises a storage, a network interface and a central processing unit.

The storage is adapted for storing a reference pattern and a task related to said reference pattern. The task can comprise a time factor, a playing time or other additional limitations. The task can comprise the rules of said game and the address to which the picture is to be sent.

Said network interface is connected to a communication network to receive at least one pattern or picture from at least one player via said wireless network.

Said central processing unit is connected to said storage and to said network interface. Said central processing unit is configured to compare said received pattern or picture with said reference pattern to determine a value or a degree/grade of similarity for each of said received patterns in relation to said reference pattern. The determination of the similarity is performed automatically by using an automated comparing algorithm. The determination of the similarity value can be performed according to said stored task. Said central processing unit is further configured to notify senders of said received patterns via said network interface according to said determined value of the degree of similarity and said stored task.

The described network device can act as a game server or as a challenger device.

According to yet another additional aspect of the present invention a network device for generating a second object according to a first object received via a communication network, wherein a first object is a reference object provided by a first party, is provided. The network device comprises a storage, a network interface a camera and a display.

Said network interface is connectable to a communication network to receive said first object and a task related to said first object. Said storage is connected to said network interface, to store said first object and said related task. Said camera is provided for taking at least one picture according to said first object and said related task, said camera being connected to said storage. Said display is provided for displaying said task, said first object and said at least one picture taken.

In the network game implementation this is a network device for participating in an electronic communication network game. The network device comprises a storage, a network interface, a camera and a display.

Said camera is for taking at least one picture according to a task pattern and said related task. In a basic version the task pattern is not necessarily received via a wireless communication channel. In a basic version, a user or player can take a picture according e.g. a reference picture on a postcard. Said storage connected to said camera is arranged to store pictures that have been taken. Said network interface is connectable to a communication network and is connected to said storage to be able to send said pictures taken to a game pal (challenger) or to a game server. Additionally, said network interface can be used to receive a task pattern and a respective task from a challenger device or a game server via said communication network. A received task pattern and said task related to said task pattern can be stored in said connected storage. Said display is for displaying at least a taken picture. Additionally, said task and said task pattern can also be depicted on said display.

This described network device can serve as a participant in a network game or as the counterpart to the challenger or server device. It can be seen that the device required to take part in the game can be embodied much simpler than the challenging device, as the capability to determine a similarity measure is dispensable.

A more sophisticated game device can comprise the features of the challenger device and of the device taking said challenge. Such a combined device can be used to act as the game operator device or challenger device as well as the gaming device. The device can therefore take pictures, define tasks and task patterns or reference pictures, send and receive pictures or patterns and compare received pictures with a reference picture to determine a similarity value. With at least two of such devices two players can play against each other with alternating roles of the challenger or game operator and player.

In another example embodiment said network device network server or said network interface comprises a mobile telephone. By integrating a device in a mobile phone, it can be avoided to produce proprietary single gaming devices.

In another example embodiment said first and/or second objects or patterns received or transmitted via said communication network are digital pictures.

According to another aspect of the present invention an electronic picture camera is provided that is capable to take a picture according to a first object or reference pattern or reference picture. An electronic or digital camera according to the present invention comprises a viewfinder means, a first object or reference pattern storage and means to display said range of view of said camera and said first object or reference pattern using cross-fading techniques.

The viewfinder means is for displaying the range of view of said camera and represents the state of the art. The viewfinder means can be a conventional set of lenses or an electronic display.

The first object or reference pattern storage is to store at least one first object or reference pattern. Said means to display said range of view of said camera and said first object or reference pattern using cross-fading techniques can be embodied fully electronically in case of an electronic viewfinder display. Said means to display said range of view of said camera and said first object or reference pattern using cross-fading techniques may be embodied using semi-transparent displays, beam splitters or head up displays.

The means to display said range of view of said camera and said reference pattern using cross-fading techniques may be controlled by a small dial. The fading can be embodied as any kind of known fading technique. So a user can simply take pictures in resembling historical originals by arranging the objects of the picture to be taken until their mutual position relation is substantially the same as in famous paintings, e.g. for arranging a portrait in a "Mona Lisa" style. The camera may also be fitted with the similarity determining algorithm described above for improved fun for the user of the camera.

In another example embodiment of the present invention such a camera is incorporated in a network gaming device as described in the above description.

According to another aspect of the present invention a network system for comparing at least two objects, wherein a first object is a reference object provided by a first party and at least one second object is a comparison object provided by at least one second party, and the first party and the at least one second party are involved in the comparison over a communication network is provided. The network system can be implemented to operate an electronic communication network game. The system comprises at least one challenger or server device according to the preceding description and at least one counterpart device according to the preceding description. The minimum requirement to provide such a system is a server device and a cam-phone device.

BRIEF DESCRIPTION OF THE DRAWINGS

In the following, the invention will be described in detail by referring to the enclosed drawings in which.

DETAILED DESCRIPTION

One mode to implement the invention requires at least two, but preferably three, camera phones each having the game application in the phone. Another alternative implementation involves a network server, whereby the terminal implementation can be made with a lighter weight, wherein the terminal does not need to be provided with any additional built in features. The parameters of the game can be varied according to the implementation and even somewhat by the players.

Figure 1:
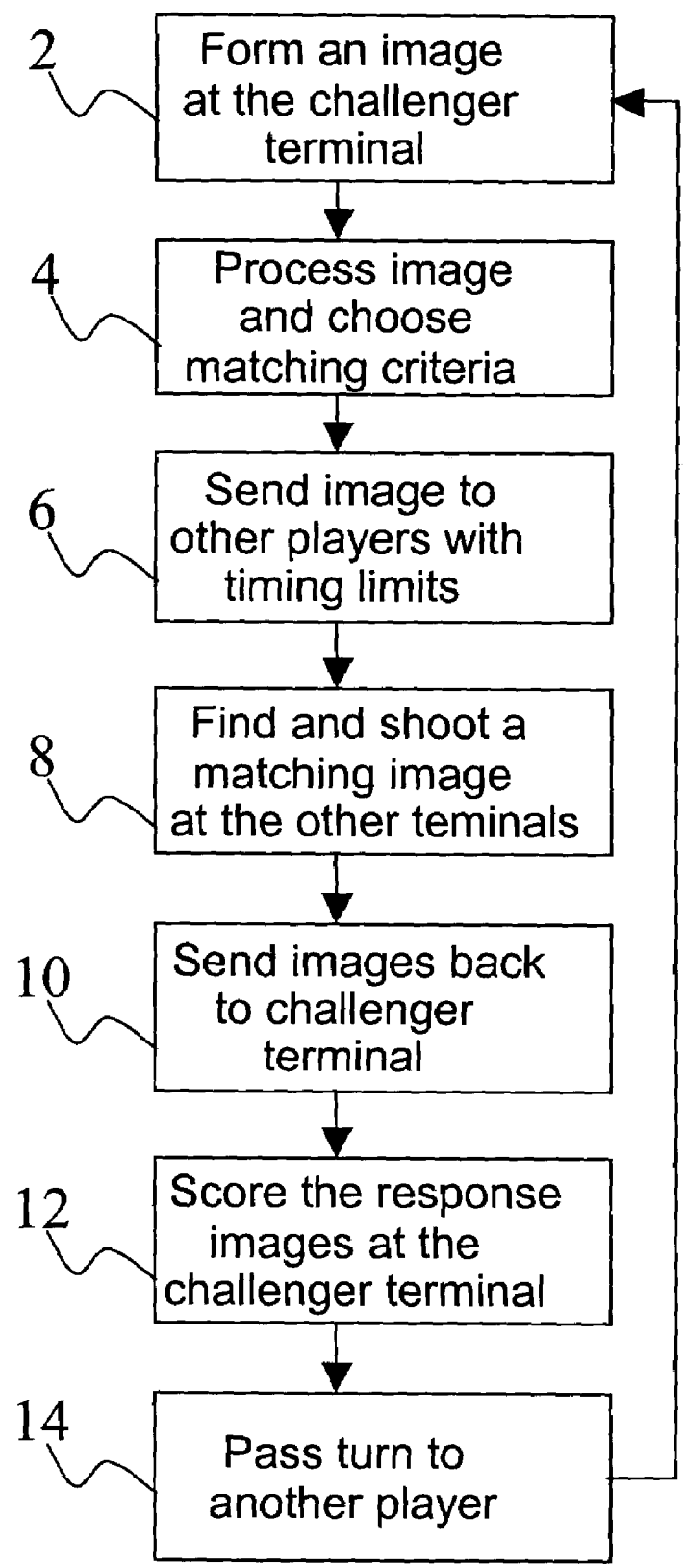
FIG. 1 presents a basic flowchart of a terminal-based implementation of the invention.

FIG. 1 presents the basic flowchart of the game in a terminal-based implementation. In the terminal-based implementation, the challenger takes 2 a picture. The challenger may process the picture and can choose at least one matching criteria. The challenger may e.g. process 4 the picture by changing the colors, define region(s) of interest and may choose at least one matching criteria such as region, color, or mutual position of contrast elements. The challenger sends 6 the picture and maybe a short description of the rules, possibly generated automatically by the game application, and the task or target to the other players via a multimedia message (or any other suitable message). The other players will store the received image to a gaming folder where all the other images acquired in the game will also be stored. The game application utilizes the camera application and some image processing functions, but the image folder created in the game is a normal directory storing images, which will remain as a "memory" of the gaming session. When a player accepts the challenge, he opens a received image in the game application and starts to search a good match with the image using any matching criterion (he may choose this) of the game. This is preferably carried out so that both the received image and the viewing area of the camera are overlapped (50% transparency of the viewing area).

Alternatively, the result of the matching can be displayed on the viewing area. When the player is satisfied with the image to be taken, he takes 8 the image and stores it to the gaming folder. The player may have the option to take, e.g., three images, and after that he has to choose the best image and send 10 the response. The game application may limit the search time to, e.g., one minute, and the number of snapshots may be unlimited. In this mode, also a video sequence may be captured to match with the challenge image. When the player has sent 10 the best match to the challenger, the challenger rates 12 the matches of the different players and declares the winner, preferably sending the winning image or video clip to all the other players. Rewarding in this scheme may be voluntary or may involve, e.g., vouchers for some digital content or even electronic money. Depending on the strategy in the game the winner is declared if a similarity value above 50% has been reached. In case a price has been set, the price may have to be paid by the challenger or by the player(s) with the lowest similarity degree value. After the round has been completed, the turn of challenging goes 14 to another player. For example the winner or the looser of the last round, and the game starts anew. The game may also be played by two competitors, by exchanging targets and evaluating the speed and similarity value at the end of each round. The players may be able to purchase or win "matching engines" that make the finding of a match easier by offering automated functions to the viewfinder for playing the game. The "matching engines" can be embodied a small programs to enable the system to superpose the target pattern or target object in the viewfinder. Other applications can comprise rated handicap lists comprising staggered list of hints where to find the target or how to get a picture of the target or how to solve the task. In such an embodiment, the matching engine may be single-use, or the use time may be limited, and the user may either purchase use time for such an engine, or he may win such time by loosing or winning a game round, or gain such time randomly.

Figure 2:
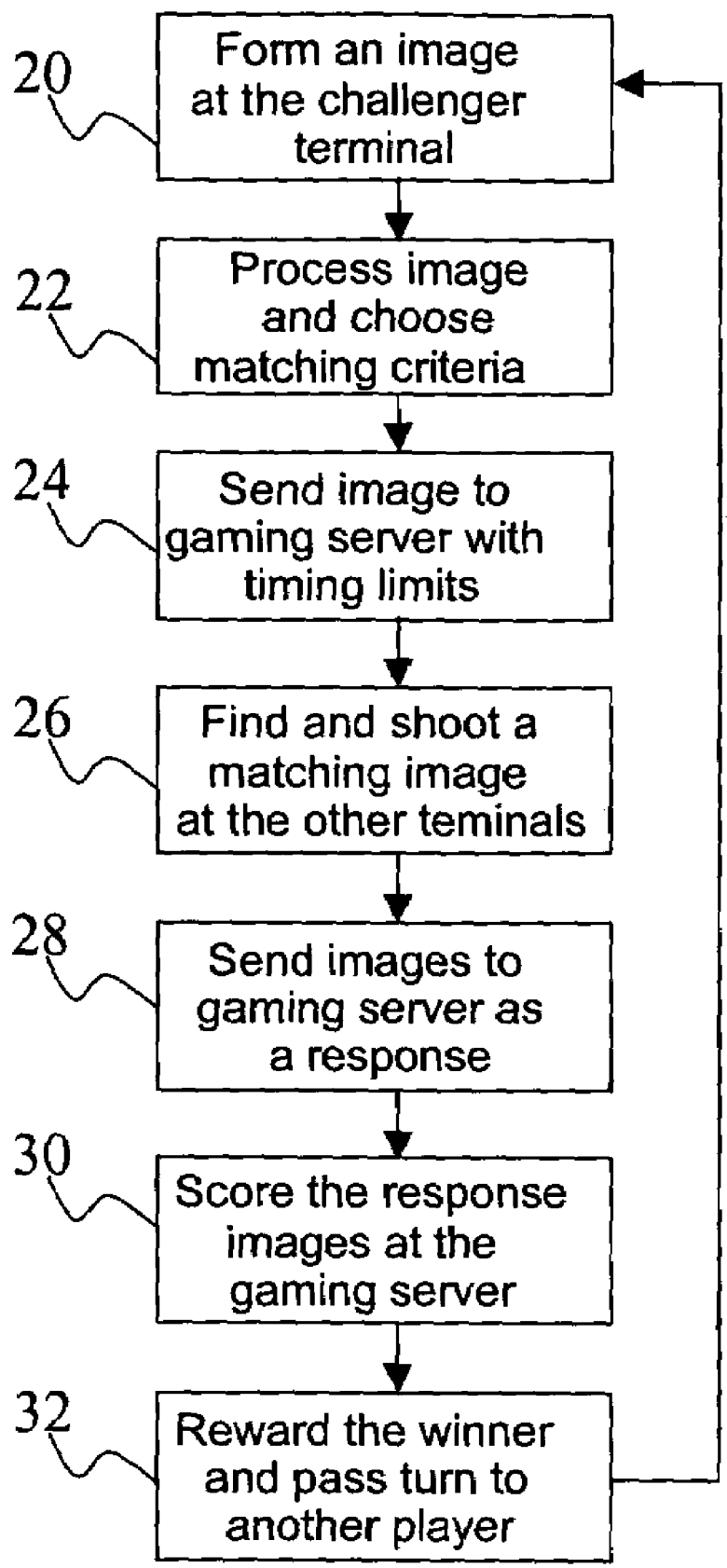
FIG. 2 presents a basic flowchart of a network-based implementation of the invention.

FIG. 2 presents the basic flowchart of the game in a network-based implementation. In the server-based implementation, at least the storing and sending 24 of the images takes place via the server. Furthermore, the matching may also take place on the server and no special gaming application is needed at the terminal. The target image may be taken 20 and be processed from a challenger and then be sent to a server. The server may also process the target image and choose matching criteria 22. The time limit may then start from the sending of the image from the server 24 to the challenged players, and the players may be allowed to find and take 26 and submit 28 a certain number of images as a response. At the end of the round, the server finds 30 the winner and may reward 32 the winner by giving server credits (e.g., Club Nokia credits) or, if the server is run by a network operator, by allowing some free multimedia messages to be sent from the winning terminal. In the latter case, sending a next new challenging image to all the game pals may be always free, and only the responses will be charged. Alternatively or additionally, the users may also win enhancements to the game application (such as the matching engine described above) or gain such enhancements as they play the game longer. In the server implementation, the players can acquire a common picture album on the server as the game proceeds.

In both implementations, using stored images may or may not be allowed. If the use of stored images is allowed, the images may, e.g., be used only once as a response (the gaming application will record the use of images). However, the gaming application may also comprise a search function that allows the best matching image to be found amongst the images stored on the terminal. Alternatively, the player may be allowed to submit a number of images to the server and the server will choose the best matching image as the player's response.

Time stamp, additional time information, or a location stamp, additional location information (GPRS, Base Station, Hotspot, GPS, and the like based) can be used to individualize the picture and later check that the car was actually in that point at that time. The same information can also be used to set up distribution maps, range maps of species and other post data processing as each photo can be related to a point and a time. When evaluating the data it must be considered that the evaluation should take into account that the distribution of the data sources, and the data collection behavior is not even or evenly distributed.

Figure 2A:
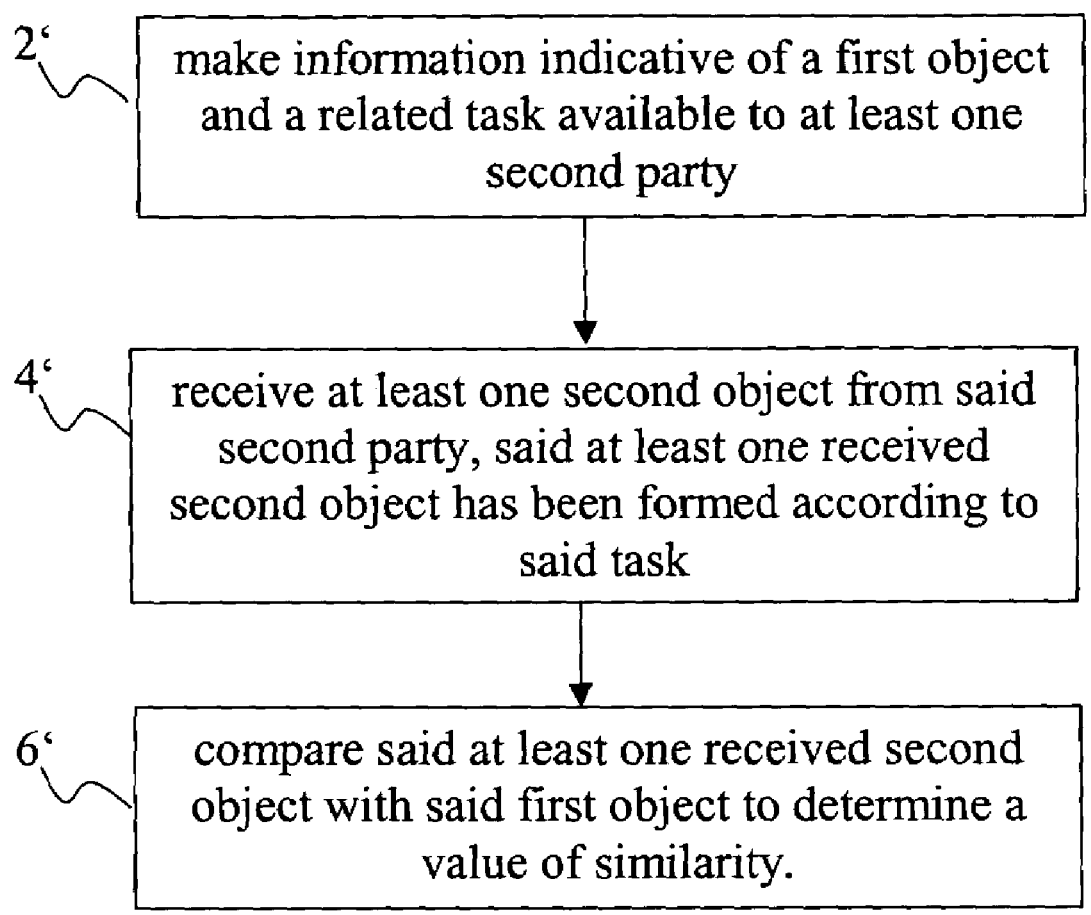
FIG. 2A presents a basic flowchart of a method for comparing at least two objects.

FIG. 2A presents a basic flowchart of a method for comparing at least two objects, wherein a first object is a reference object provided by a first party and at least one second object is a comparison object provided by at least one second party, and the first party and the at least one second party are involved in the comparison over a communication network. The method starts with making 2' information indicative of said first object and a task related to said first object available to said at least one second party. In a next step said first party receives 4' at least one second object from said second party, wherein said at least one received second object has been formed according to said task by said at least one second party. The execution of the basic method is completed comparing 6' said at least one first object with said second object to determine a value of similarity. All the above described extensions are founded on this basic method.

Figure 3:
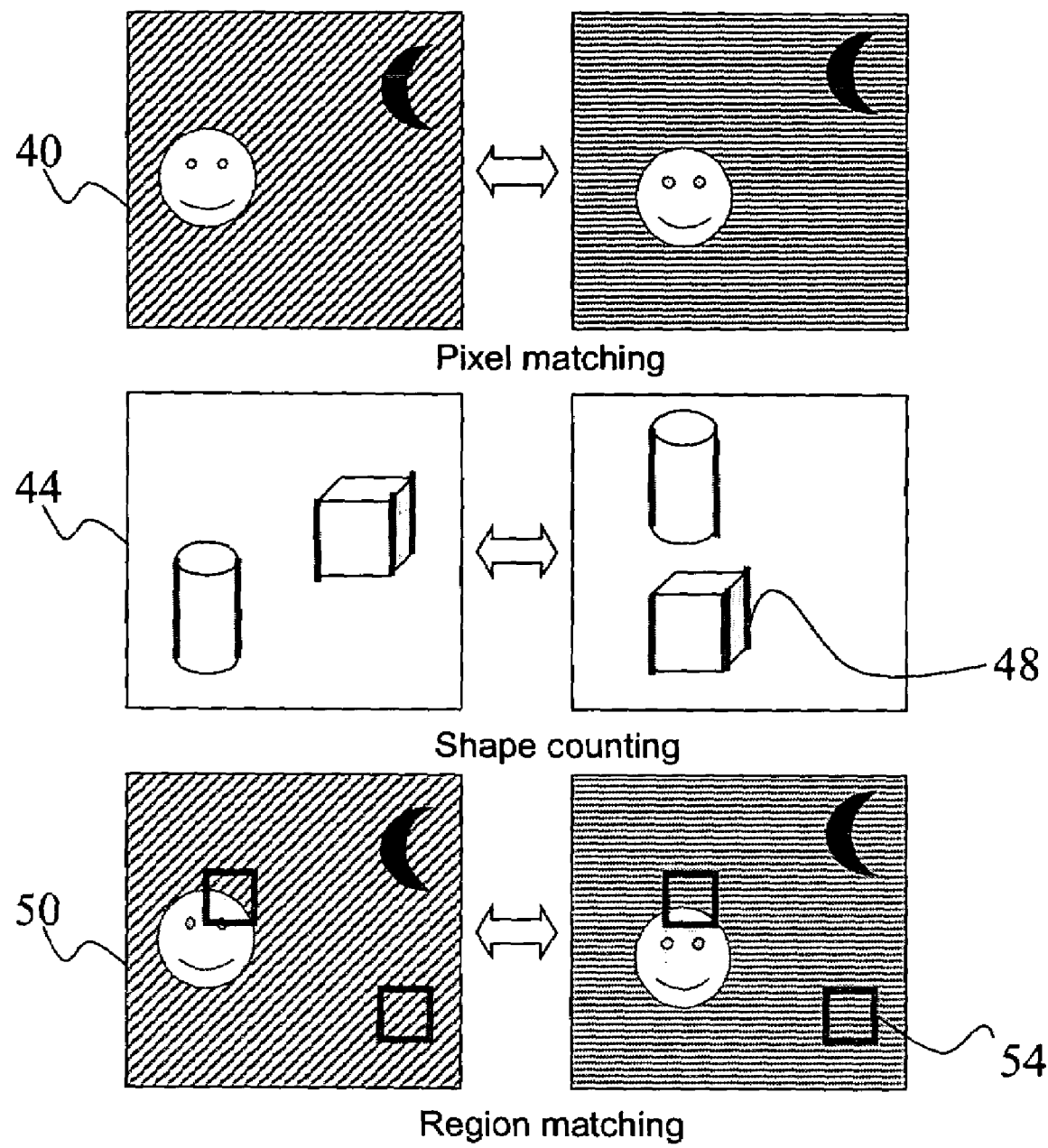
FIG. 3 presents some different matching criteria.

FIG. 3 presents some different matching criteria. The challenger may pick the matching criteria to be used or they may be freely chosen by the players. Alternatively, the criteria are chosen randomly when the challenge is sent. The criteria can include almost any image processing operations: 1) pixel matching 40 of a) the whole image, b) parts of the image, or c) any block to any block, 2) pattern matching 44 (of the number) of a) certain features like edges 48 or smooth areas, b) certain detected shapes or objects and 3) transform matching 50 of a) transformed images or b) parts 54 of a transform of whole or part of the image. More specifically and as an example only, colors, ornaments, geometric shapes, faces, vehicles, license plates, or other object shapes may be used as matching criteria.

When the scores are determined, various scoring schemes are possible. The winner may get one point for the round, or a multiplicity of best matches may be awarded points, for example, in the manner used in many sporting events like Formula 1 races. Alternatively, the score may be derived directly from the similarity match. For rewarding, the scores can then be converted to monetary units or virtual credits used in many services. To boost the game, movie theatres or such may give out free tickets for the best players. In such arrangements it is also possible to send the challenge images out centrally, whereby they can be related to the event being promoted. A group of people may engage in a contest against each other according to a theme, and one of the registered players may win a free entrance or some other bonus, while the others just get the excitement.

Figure 4:
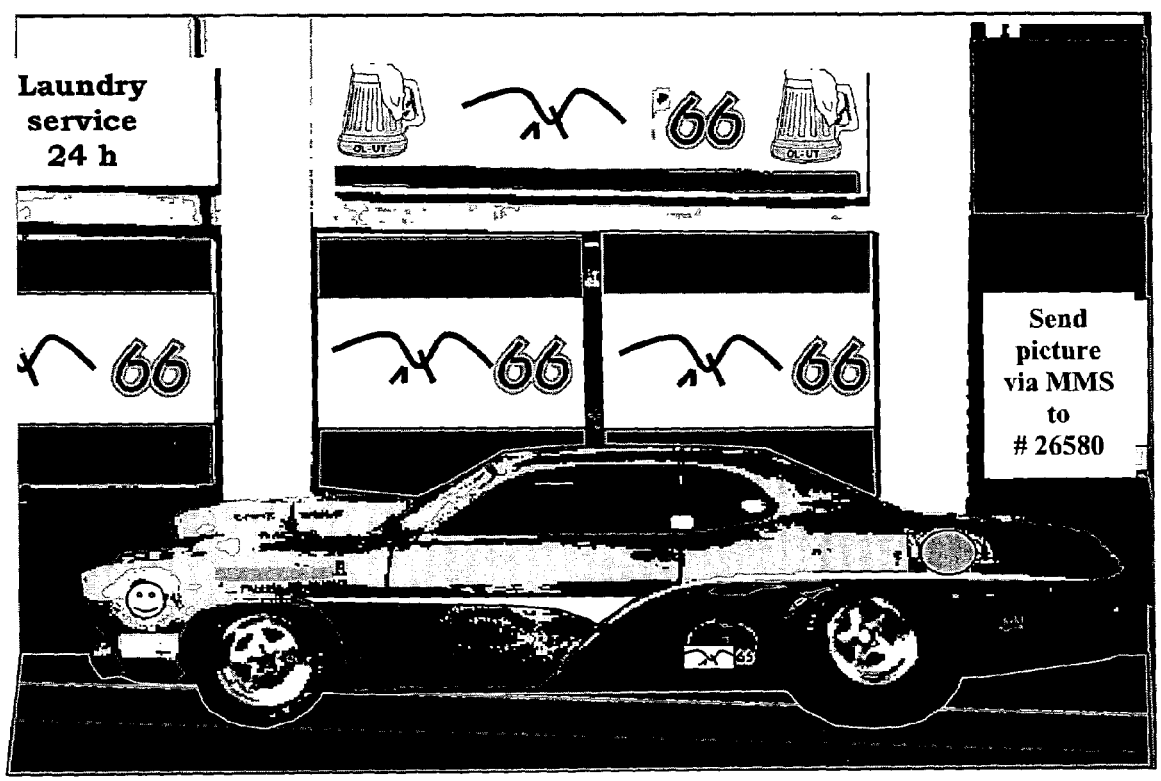
FIG. 4 shows an exemplary task pattern or target picture.

FIG. 4 shows an exemplary task pattern or target picture. The depicted picture comprises a car in front of a pub, i.e. a taken picture can only reach a maximum similarity if the car is actually parked in front of said pub as the game starts. In yet another embodiment, the user may send several images as a response to the task, whereby parts of the task image can be found in each response image. Such composite tasks may be, e.g., "take a picture of this car in front of this restaurant", and sending a composite response having one picture taken of the restaurant and another one taken of the car may qualify as a valid response to the task. In this embodiment, sending one picture where both the restaurant and the car are present may be preferred over the composite response, but sending a picture of the car only may be completely disqualified.

Figure 5:
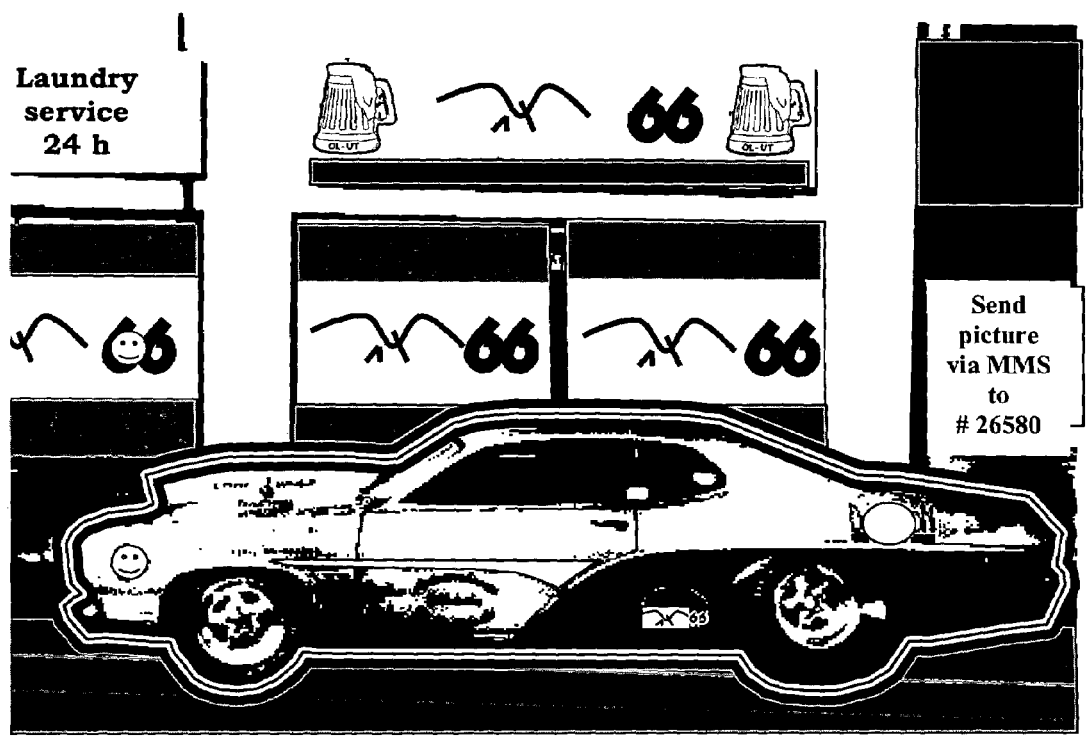
FIG. 5 shows an exemplary task pattern or target picture with a marked region of interest.

FIG. 5 shows an exemplary task pattern or target picture with a marked region of interest. FIG. 5 can also depict a overlaid target pattern (the silhouette) with the viewing area of the camera (black and white background). In case of the depicted configuration, solely the unique silhouette of the car may be sufficient as a target pattern. FIG. 5 can also be interpreted as a target picture with an indication of a region of interest embodied as the line outlining the car, thereby a spotting game can be played even if the car is actually not parking in front of said pub. In case of a marked region of interest, only that part of the picture within the outlining is used for determining the similarity value.

An implementation of the present invention that makes a minimal use of a wireless communication network can comprise posting of the reference picture or a pattern via a supplement in a magazine or as a free sample to be in advertising campaigns. The reference picture or "target" can be depicted on a postcard, wherein on the backside of said postcard the rules of the game are depicted. The reference picture can be depicted as a cartoon style drawing, to prevent that players simply takes a picture from said postcard. A possible target picture is depicted in FIG. 4. A participant in said game can follow the rules on the backside of said postcard including a telephone number or a network address. So a user can simply have a picture of a target, the instructions to take a picture and a destination address to send the picture to.

In an alternative embodiment, the challenge or task and the picture can be received over local connectivity, e.g., by BlueTooth from a local broadcaster. Such an arrangement is convenient, e.g., at stores, shops, kiosks, advertisement boards and the like, whereby a user may get a task or a spotting challenge related to the product that he can see in his vicinity. Yet alternatively, such challenges may be embedded in a product that the user purchases, e.g., in a cereal box, container of a lubrication agent, etc. Yet alternatively, the challenge may be delivered to the user over local connectivity in a theatre or a restaurant, or multiplexed or supplied additionally to a television or radio transmission. For example, the advertisements shown amid a TV or movie presentation can be delivered over the local connectivity to the devices in the vicinity.

The pictures are transferred to the organizer of said game, i.e. a game server, via a wireless network connection. The organizer of said game can automatically compare all received pictures with the reference picture. During said comparison, the organizer can arrange the received pictures according to respectively determined similarity values. The most similar, a predetermined number of the most similar ones or every picture with a similarity degree above a threshold can be chosen to be a winner. The prize may be related to a similarity value. Further information like time, location etc. can be added to the picture taken to help verifying correctness of the picture so that the picture is taken in the right area and within the specified time. This adding of time or locality information can be accomplished by the use of methods known as such to the skilled person, e.g., by GPS or network positioning and providing a digital signature to the data.

The winner(s) of said game can be notified via telephone, radio broadcast, TV broadcast, post, SMS or the like. So, in the simplest case the game may be played by using the wireless network only for transferring the pictures to the address of the game organizer.

The invention makes use of camera phones more variable and gives new business opportunities for both operators and companies. It also presents a method for changing of pictures between friends. The invention makes exchanging pictures really comfortable, and at the same time a group of friends may collect a mutual image gallery. The invention increases the usage of multimedia messages, which will eventually bring the prices thereof down. Skilled users of the camera phone may also reduce the costs of using the multimedia messages, which would increase the appeal of camera phones. The present invention also provides a new, more attractive way to attend a spotting competition. To participate and use the present invention, a user has to purchase an imaging phone.

An aspect of the invention is the comparison of images taken by several camera (phone)s to a reference picture.

The spotting competition can be organized so that there is no cost to the user. The spotting competition can be organized so that there is no cost to the organizer.

The game functionality is easily seen from the terminal and a system advertising such a game needs to be supported by these terminals. The whole structure of the came can be made very transparent as the rules of the game can be simultaneously transferred with said target picture.

This invention proposes a new way to use multimedia messaging and image comparison together as a game or a competition. This invention proposes a new way to use multimedia messaging and image comparison together as a new way for or a study/research. It may be noted that the present invention is not to be restricted to a public use in games and other tasks, but can also be applied to a restricted group of people such as market research groups of scientists in field research projects, or other applications wherein distributed events or objects can be recorded for research. Such research can also be applied to any kind of dropped down objects such as airborne delivered relief supplies, meteoric debris and the like.

A reference picture is made available on server and all participants can take pictures with their camera phones and send them to server for image comparison. Comparison can be done in several ways. This method could be easily used as a competition or a game where company puts out reference picture and whoever gets closest picture gets prize etc. The results of the game and a selection of the best reference pictures could be shown on an Internet address such as "www-server", a WAP address or for example in television.

The invention introduces the technical means for implementing a multiplayer imaging game. In the game, one of the players takes a picture (or a video clip) and sends this challenge to the other players. The other players can view the image and try to capture an image that is as similar as possible according to some measure. The images taken by the other players are then sent back to the sender of the challenge, and the player that got the highest match will win the round. The winner may be rewarded by some means. The challenge turn then goes to another player.

A new system for handling spotting competitions is introduced. The competition may be announced as earlier or by sending a MMS to users mobile. The task (spotting the target) can e.g. be "Take a picture of the car or a logo on the car and send it to number xxx." When this picture is received at a server picture is compared to a reference picture with common technologies. If the match is acceptable a reward is given to the spotter. Especially if the task is to take a picture of a logo it is easier to make the comparison at the server. Naturally the target of the spotting competition can be whatsoever: a person, a butterfly, a train. The target can also be the stations of a paperchase, wherein the single stations of said paperchase can be used to receive the picture of the next checkpoint. The target can also be the solution of a game with matchsticks and the target would be to take a picture of the matches in the solution configuration.

Figure 6:
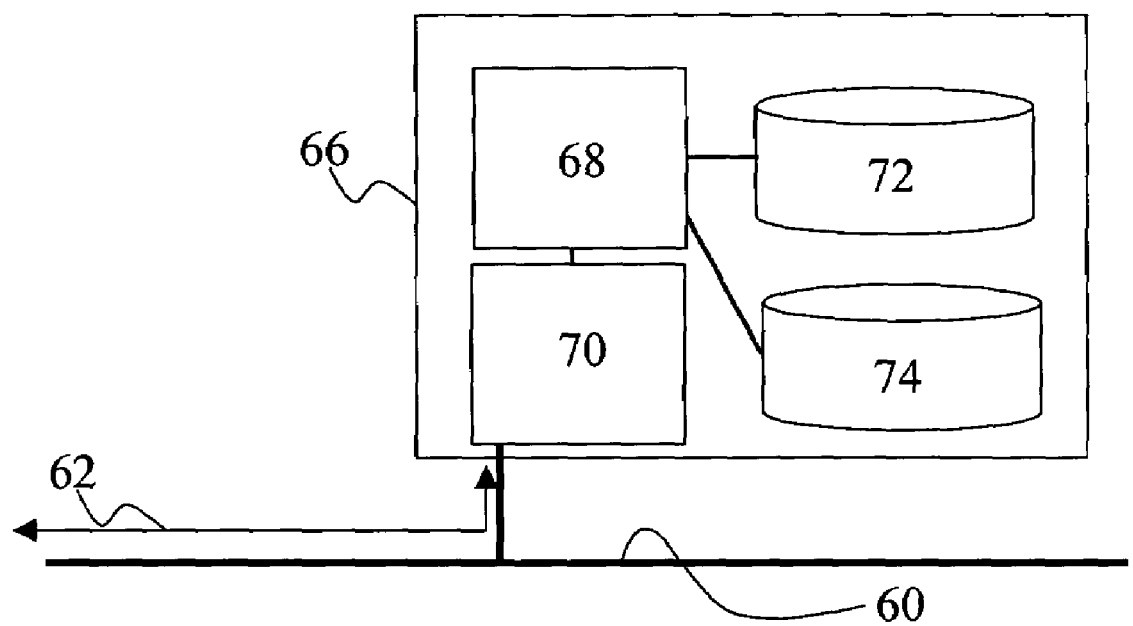
FIG. 6 shows an embodiment of a network device that can be operated as a server device.

FIG. 6 shows an embodiment of a network device that can be operated as a server device. The depicted server device 66 comprises an interface or a interface module 70 to connect the device to a communication network 60. The communication network 60 can be any kind of communication network. The communication network can be wireless communication network such as an mobile telephone network. The network 60 provides a communication to terminal devices as indicated by the arrow 62. The server device 66 further comprises central processing unit (CPU) 68 and a storage 72 and a storage 74. The storage 74 is for storing first objects and related tasks. That can be posted via the communication network to terminal devices. The task can be any kind of task as has been described in the preceding specification. The server can receive second objects from different senders via said communication network 60 and can store the second objects and the addresses of the senders in the storage 72. In dependence of the task the received second objects can be evaluated by performing comparing algorithms in the CPU 68 between the first and second objects according to the task. According to the task and the result of the comparing algorithms the sender of the best matching or most similar second object can be determined and notified.

Figure 7:
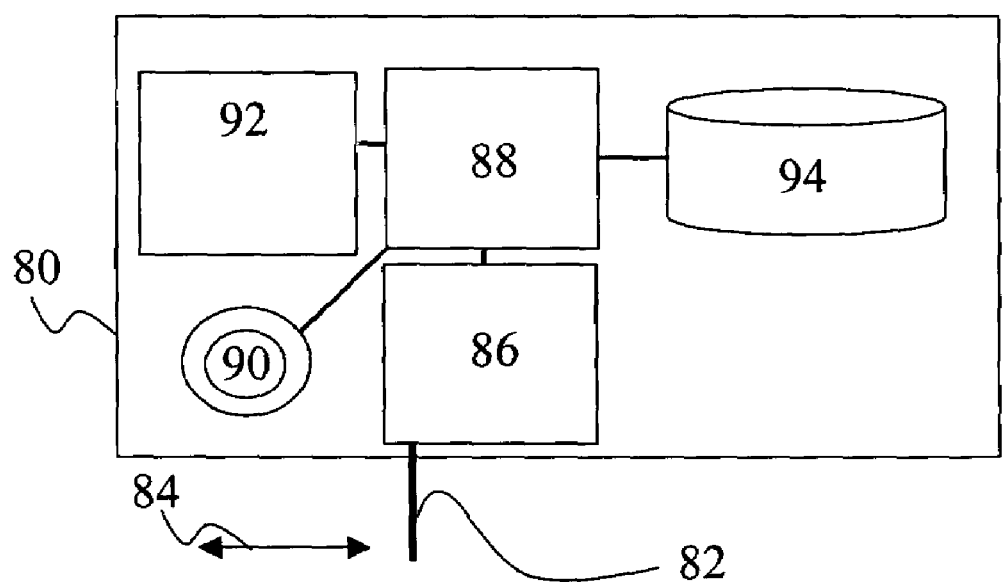
FIG. 7 shows an embodiment of a network device that can be operated as a network terminal device.

FIG. 7 shows an embodiment of a network device that can be operated as a network terminal device. The depicted terminal device 80 is embodied as wireless network terminal device. The air or radio interface 86 can communicate 84 via an antenna 82 with a communication network (not shown). The radio interface 86 to the communication network is connected to a central processing unit (CPU) 88 of the terminal device 80. In this embodiment, the CPU is connected to a storage 94, an optical recording system 90 (i.e. a lens system with a CCD (Charge coupled device) chip) and a display 92 acting as a viewfinder and a display. With the interface 86 the device can receive first objects or reference patterns and tasks, and store them in one of the storage 94. The device can take pictures via the optical recording system 90 and store them in the storage 94. The terminal device 80 can also be configured to display received first objects and the actual field of view simultaneously on the display 92 by using cross fading techniques provided by said CPU 88.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

What is claimed is:

1. A method for comparing at least two objects, wherein a first object is a reference object provided by a first party and at least one second object is a comparison object provided by at least one second party, and the first party and the at least one second party are involved in the comparison over a communication network, comprising:
    making information indicative of said first object and a task related to said first object available to said at least one second party,
    receiving at said first party said at least one second object from said second party, wherein said at least one received second object has been formed according to said task by said at least one second party, and
    comparing said at least one second object with said first object to determine a value of similarity.

2. A method according to claim 1, further comprising making a decision on the success of the carrying-out of the task, wherein said decision of said success being based on said value of similarity.

3. A method according to claim 1, further comprising notifying said at least one second party whose second object exceeds a determined value of similarity.

4. A method according to claim 1, further comprising receiving at least one object from at least one of said second party via a wireless network.

5. A method according to claim 1, wherein said making information available to said second party, is performed by using said communication network.

6. A method according to claim 1, wherein said at least one second object received from said at least one second party is at least one digital picture.

7. A method according to claim 1, wherein said information indicative of said first object is substantially identical to said first object.

8. A method according to claim 1, wherein said comparing of said at least one received second object with said first object is performed by pixel matching, region matching, shape counting or any combination thereof.

9. A method according to claim 1, wherein said information indicative of said first object comprises a region of interest that is emphasized by a mark.

10. A method for comparing at least two objects, wherein a first object is a reference object provided by a first party and at least one second object is a comparison object provided by at least one second party, and the first party and the at least one second party are involved in the comparison over a communication network, comprising:
    establishing a state defining said one of said parties as the first party, and all other parties as second parties,
    generating said first object at said first party,
    making information indicative of said first object and a task related to said first object available to said at least one second party, via said communication network,
    receiving at said first party at least one second object from said second party, wherein said at least one received second object has been formed according to said task by said at least one second party,
    comparing said at least one second object with said first object to determine a value of similarity,
    making a decision on the success of the carrying-out of the task, wherein said decision of said success is based on said value of similarity,
    notifying said at least one second party whose second object exceeds a determined value of similarity, and
    passing the state of the first party to one of said second parties by establishing one of said second parties as first party.

11. A method for operating a network game system comprising a network server device and network devices in a wireless communication network, comprising the procedures as disclosed in claim 1.

12. A method according to claim 1, wherein said objects are transferred by using multi media messaging.

13. A method according to claim 1, wherein said notifications are posted via a television broadcast network.

14. A computer program product comprising program code means stored on a computer readable medium for carrying out the method of claim 1, when said program product is run on a computer or network device.

15. A computer program product comprising program code, downloadable from a server for carrying out the method of claim 1, when said program product is run on a computer or network device.

16. A computer data signal embodied in a carrier wave and representing a program that instructs a computer to perform the steps of the method of claim 1.

17. A network device for comparing at least two objects, wherein a first object is a reference object provided by a first party and at least one second object is a comparison object provided by at least one second party, and the first party and the at least one second party are involved in the comparison over a communication network, said network device comprising:
    a storage for storing said first object and a task related to said first object,
    a network interface connected to said communication network to receive at least one of said second objects from said at least one second party via said wireless network, and
    a central processing unit being connected to said storage and to said network interface,
    wherein said central processing unit is configured to compare said at least one received second object with said first object to determine a value of similarity for each of said received at least one second objects in relation to said first object according to said stored task, and wherein said central processing unit is further configured to notify senders of said received second objects via said network interface according to said determined value of similarity and said stored task.

18. A network device according to claim 17, wherein said object received via said communication network is a digital picture.

19. A network system for comparing at least two objects, comprising:

at least one network device for comparing at least two objects, wherein a first object is a reference object provided by a first party and at least one second object is a comparison object provided by at least one second party, and the first party and the at least one second party are involved in the comparison over a communication network, said network device comprising:

a storage for storing said first object and a task related to said first object, a network interface connected to said communication network to receive at least one of said second objects from said at least one second party via said wireless network, and a central processing unit being connected to said storage and to said network interface, wherein said central processing unit is configured to compare said at least one received second object with said first object to determine a value of similarity for each of said received at least one second objects in relation to said first object according to said stored task, and wherein said central processing unit is further configured to notify senders of said received second objects via said network interface according to said determined value of similarity and said stored task, wherein said network device comprises a mobile phone; and at least one network device for generating a second object according to a first object received via a communication network wherein a first object is a reference object provided by a first party, said network device comprising:

a network interface connectable to a communication network to receive said first object and a task related to said first object, a storage connected to said network interface, for storing said first object and said related task, a camera for taking at least one picture according to said first object and said related task, said camera being connected to said storage, and display for displaying said task, said first object and said at least one picture taken.

* * * * *